(12) United States Patent
Uchiyama et al.

(10) Patent No.: US 11,936,034 B2
(45) Date of Patent: Mar. 19, 2024

(54) NEGATIVE ELECTRODE ACTIVE SUBSTANCE FOR SECONDARY BATTERY, AND SECONDARY BATTERY

(71) Applicant: Panasonic Intellectual Property Management Co., Ltd., Osaka (JP)

(72) Inventors: Yohei Uchiyama, Hyogo (JP); Norihisa Yamamoto, Osaka (JP); Tatsuya Akira, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 164 days.

(21) Appl. No.: 16/957,182

(22) PCT Filed: Dec. 26, 2018

(86) PCT No.: PCT/JP2018/047755
§ 371 (c)(1),
(2) Date: Jun. 23, 2020

(87) PCT Pub. No.: WO2019/131724
PCT Pub. Date: Apr. 7, 2019

(65) Prior Publication Data
US 2020/0321611 A1    Oct. 8, 2020

(30) Foreign Application Priority Data
Dec. 27, 2017  (JP) .................. 2017-252456

(51) Int. Cl.
*H01M 4/36*    (2006.01)
*H01M 4/485*   (2010.01)
*H01M 10/0525* (2010.01)

(52) U.S. Cl.
CPC .......... *H01M 4/364* (2013.01); *H01M 4/485* (2013.01); *H01M 10/0525* (2013.01)

(58) Field of Classification Search
None
See application file for complete search history.

(56) References Cited

U.S. PATENT DOCUMENTS

2012/0202112 A1* 8/2012 Yushin ............ H01M 10/0525
429/246
2012/0258370 A1  10/2012 Miyoshi et al.
(Continued)

FOREIGN PATENT DOCUMENTS

CN   105849953 A   8/2016
CN   107863512 A   3/2018
(Continued)

OTHER PUBLICATIONS

International Search Report dated Apr. 2, 2019, issued in counterpart International Application No. PCT/JP2018/047755. (2 pages).
(Continued)

*Primary Examiner* — Zhongqing Wei
(74) *Attorney, Agent, or Firm* — WHDA, LLP

(57) ABSTRACT

A negative electrode active substance particle according to one embodiment of the present invention, comprises a mother particle that has: a silicate phase that includes Na, Si, and at least one element selected from M, $M^1$, $M^2$, $M^3$ and $M^4$ (M is an alkali earth metal, and $M^1$, $M^2$, $M^3$ and $M^4$ are elements other than alkali metals, alkali earth metals or Si); and silicon particles dispersed in the silicate phase. The contents of the elements in the silicate phase are: 9-52 mol % of Na; 3-50 mol % of M, $M^1$, $M^2$, $M^3$ and $M^4$; and at least 25 mol % of Si.

9 Claims, 1 Drawing Sheet

(56) References Cited

U.S. PATENT DOCUMENTS

| | | | |
|---|---|---|---|
| 2016/0322637 A1 | 11/2016 | Nakanishi et al. | |
| 2017/0155150 A1* | 6/2017 | Barker | C01B 33/32 |
| 2018/0090750 A1* | 3/2018 | Oh | H01M 4/364 |
| 2018/0166683 A1 | 6/2018 | Yamauchi | |
| 2018/0287148 A1 | 10/2018 | Akira et al. | |
| 2018/0342757 A1* | 11/2018 | Choi | H01M 4/583 |

FOREIGN PATENT DOCUMENTS

| | | | | |
|---|---|---|---|---|
| JP | 2011-233245 A | 11/2011 | | |
| JP | 2014-139919 A | 7/2014 | | |
| JP | 2015-125815 A | 7/2015 | | |
| WO | 2011/077654 A1 | 6/2011 | | |
| WO | 2015/177567 A1 | 11/2015 | | |
| WO | 2016/121320 A1 | 8/2016 | | |
| WO | WO-2016204366 A1 * | 12/2016 | | H01M 10/0525 |
| WO | 2017/026228 A1 | 2/2017 | | |

OTHER PUBLICATIONS

Extended (Supplementary) European Search Report dated Dec. 18, 2020, issued in counterpart EP Application No. 18895591.8. (8 pages).

English Translation of Chinese Search Report dated Oct. 8, 2022, issued in counterpart CN application No. 201880083028.2. (2 pages).

* cited by examiner

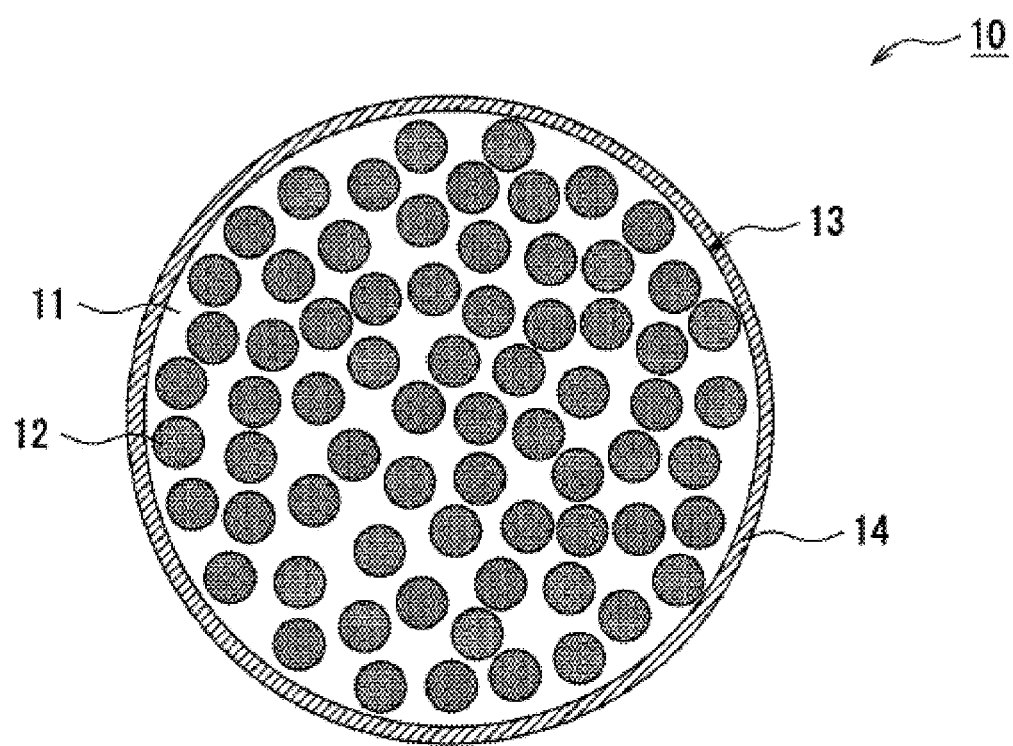

NEGATIVE ELECTRODE ACTIVE SUBSTANCE FOR SECONDARY BATTERY, AND SECONDARY BATTERY

TECHNICAL FIELD

The present disclosure relates to a negative electrode active material for a secondary battery, and a secondary battery.

BACKGROUND ART

It is known that silicon materials such as silicon (Si) and silicon oxide represented by $SiO_x$ can intercalate more ions such as lithium ions per unit volume than carbon materials such as graphite.

For example, Patent Literature 1 discloses a non-aqueous electrolyte secondary battery in which a mixture of $SiO_x$ and graphite is used as a negative electrode active material.

CITATION LIST

Patent Literature

PATENT LITERATURE 1: Japanese Unexamined Patent Application Publication No. 2011-233245

SUMMARY

It is desired that charge/discharge cyclic characteristics be improved in secondary batteries in which silicon particles are used as a negative electrode active material.

Thus, an object of the present disclosure is to provide a negative electrode active material for a secondary battery that can prevent the deterioration in the charge/discharge cyclic characteristics of secondary batteries in which silicon particles are used as a negative electrode active material; and a secondary battery.

A negative electrode active material for a secondary battery according to one aspect of the present disclosure comprises a silicate phase including Na, Si, and $M^x$, wherein $M^x$ is an element other than an alkali metal or Si; and silicon particles dispersed in the silicate phase, wherein, in the silicate phase, a Na content is 9 to 52 mol %, an $M^x$ content is 3 to 50 mol %, and a Si content is 25 mol % or more, each based on the total amount other than oxygen.

A secondary battery as an aspect of the present disclosure comprises: a negative electrode having the negative electrode active material for a secondary battery described above, a positive electrode, and an electrolyte.

ADVANTAGEOUS EFFECT OF INVENTION

According to one aspect of the present disclosure, the deterioration in the charge/discharge cyclic characteristics can be prevented in secondary batteries in which silicon particles are used as a negative electrode active material.

BRIEF DESCRIPTION OF DRAWING

FIG. 1 is a sectional view schematically illustrating a particle of the negative electrode active material as an exemplary embodiment.

DESCRIPTION OF EMBODIMENTS

For example, when silicon particles are used as a negative electrode active material for a lithium ion secondary battery, the following reactions occur upon charge/discharge of the secondary battery, for example.

Usually, silicon particles have a large volume change due to the above charge/discharge reaction. Thus, when charge/discharge cycles are repeated, the particle structure is broken, resulting in the deterioration in the charge/discharge cyclic characteristics of the battery. The present inventors thus have undertaken intensive studies to find that dispersion of silicon particles in a silicate phase having a predetermined component can prevent a volume change of the silicon particles due to the charge/discharge reaction, to thereby prevent the breakage of the particle structure, thus conceiving a negative electrode active material of aspects described below.

A negative electrode active material for a secondary battery according to one aspect of the present disclosure comprises a silicate phase including Na, Si, and $M^x$, wherein $M^x$ is an element other than an alkali metal or Si; and silicon particles dispersed in the silicate phase, wherein, in the silicate phase, a Na content is 9 to 52 mol %, an $M^x$ content is 3 to 50 mol %, and a Si content is 25 mol % or more, each based on the total amount other than oxygen. The silicate phase described above has a hardness sufficient to prevent the volume change of the silicon particles due to the charge/discharge reaction. Thus, it is considered that the volume change of the Si particles due to the charge/discharge reaction is reduced by dispersion of the silicon particles in this silicate phase. Consequently, it is considered that the breakage of the particle structure due to the charge/discharge cycles is prevented and thus, the deterioration in the charge/discharge cyclic characteristics of the battery is prevented. This silicate phase exhibits a good ion conductivity for ions such as lithium ions. It is thus considered that, upon charge/discharge, ions such as lithium ions migrate relatively smoothly in the silicate phase to efficiently react with the silicon particles dispersed in the silicate phase.

The negative electrode active material for a secondary battery according to one aspect of the present disclosure is suitably used as a negative electrode active material for a lithium ion secondary battery, for example. Hereinafter, the negative electrode active material for a secondary battery according to one aspect of the present disclosure will be described with a lithium ion secondary battery taken as an example. The drawing referred for the description of embodiments below is schematically illustrated, and the dimensions, the proportions, and the like of the components illustrated in the drawing may be different from those of actual products. Specific dimensions, proportions, and the like should be determined in consideration of the description below.

A lithium ion secondary battery as an exemplary embodiment comprises a negative electrode, a positive electrode, and an electrolyte. A separator is preferably disposed between the positive electrode and the negative electrode. In an exemplary structure of the lithium ion secondary battery, an exterior body houses an electrode assembly, formed by winding the positive electrode and the negative electrode together with the separator therebetween, and the electrolyte. The electrode assembly is not limited to an electrode assembly having the wound structure, and an electrode assembly of another type may be applied, including an electrode assembly having a laminated structure formed by alternately laminating positive electrodes and negative electrodes with separators therebetween. The lithium ion secondary battery may be any form including a cylindrical shape, a rectangular shape, a coin shape, a button shape, and a laminated shape.

[Positive Electrode]

The positive electrode preferably includes a positive electrode current collector, such as a metal foil, and a positive electrode mixture layer formed on the current collector. Foil of a metal that is stable in the electric potential range of the positive electrode, such as aluminum, a film with such a metal disposed as an outer layer, and the like, can be used for the positive electrode current collector. The positive electrode mixture layer preferably includes a positive electrode active material and additionally includes a conductive agent and a binder. The surface of the particle of the positive electrode active material may be coated with micro particles of an oxide such as aluminum oxide ($Al_2O_3$) or an inorganic compound such as a phosphoric acid compound or a boric acid compound.

Examples of the positive electrode active material include a lithium transition metal oxide, which contains a transition metal element such as Co, Mn, or Ni. Examples of the lithium transition metal oxide include $Li_xCo_2$, $Li_xNi_2$, $Li_xMnO_2$, $Li_xCo_yNi_{1-y}O_2$, $Li_xCo_yM_{1-y}O_z$, $Li_xNi_{1-y}M_yO_z$, $LiMn_2O_4$, $Li_xMn_{2-y}M_yO_4$, $LiMPO_4$, and $Li_2MPO_4F$ (M; at least one of the group consisting of Na, Mg, Sc, Y, Mn, Fe, Co, Ni, Cu, Zn, Al, Cr, Pb, Sb, and B, $0<x\le1.2$, $0<y\le0.9$, $2.0\le z\le2.3$). These may be used singly, or two or more thereof may be mixed and used.

Examples of the conductive agent include carbon materials such as carbon black, acetylene black, Ketjen black, and graphite. These may be used singly or in combinations of two or more thereof.

Examples of the binder include fluoro resins, such as polytetrafluoroethylene (PTFE) and poly(vinylidene fluoride) (PVdF), polyacrylonitrile (PAN), polyimide resins, acrylic resins, and polyolefin resins. These resins may be combined with carboxymethyl cellulose (CMC) or a salt thereof (e.g., CMC-Na, CMC-K, or CMC-$NH_4$ which may be a partially neutralized salt), poly(ethylene oxide) (PEO), or the like. These may be used singly or in combinations of two or more thereof.

[Negative Electrode]

The negative electrode preferably includes a negative electrode current collector, such as a metal foil, and a negative electrode mixture layer formed on the current collector. Foil of a metal that is stable in the electric potential range of the negative electrode, such as copper, a film with such a metal disposed as an outer layer, and the like, can be used for the negative electrode current collector. The negative electrode mixture layer preferably includes a negative electrode active material (negative electrode active material particles to be explained below) and additionally includes a binder. As the binder, fluoro resins, PAN, polyimide resins, acrylic resins, polyolefin resins, and the like can be used, as in the positive electrode. When a mixture slurry is prepared using an aqueous solvent, CMC or a salt thereof (e.g., CMC-Na, CMC-K, or CMC-$NH_4$ which may be a partially neutralized salt), styrene-butadiene rubber (SBR), poly (acrylic acid) (PAA) or a salt thereof (e.g., PAA-Na or PAA-K which may be a partially neutralized salt), poly (vinyl alcohol) (PVA), or the like, is preferably used.

FIG. 1 shows a sectional view of a particle of the negative electrode active material as an exemplary embodiment. A particle 10 of the negative electrode active material shown in FIG. 1, which is a negative electrode active material contained in a negative electrode mixture layer, comprises a base particle 13 comprising a silicate phase 11 and silicon particles 12 dispersed in the phase. The base particle 13 has a sea/island structure in which fine silicon particles 12 are dispersed in the silicate matrix, for example. The particle 10 of the negative electrode active material, as shown in FIG. 1, preferably has a conductive layer 14 formed on the surface of the base particle 13.

The silicon particles 12 can intercalate more lithium ions than carbon materials such as graphite, and thus a larger battery capacity is achieved. On the surface of the silicon particles 12, $SiO_2$ as a natural oxidized film may be formed. Increase in the amount of $SiO_2$ as a natural oxidized film may lead to deterioration in the battery capacity, charge/discharge cyclic characteristics, or the like. Thus, the content of $SiO_2$ as the natural oxidized film is preferably less than 10 mass % and more preferably less than 7 mass % based on the total mass of the base particle 13.

The content of the silicon particles 12 in the base particle 13 is preferably 20 mass % to 95 mass % and more preferably 35 mass % to 75 mass % based on the total mass of the base particle 13 in view of, for example, a larger capacity and the improvement in the charge/discharge cyclic characteristics. If the content of the silicon particles 12 is too low, the charge/discharge capacity decreases, for example, and also diffusion of lithium ions may be poor to deteriorate loading characteristics. If the content of the silicon particles 12 is too high, the preventing effect on the deterioration in the charge/discharge cyclic characteristics may be reduced, for example.

The average particle size of the silicon particles 12 is, for example, 500 nm or less, preferably 200 nm or less, and more preferably 50 nm or less before the first charge. The average particle size is preferably 400 nm or less and more preferably 100 nm or less after charge/discharge. Fine silicon particles 12 exhibit reduced volume change thereof upon charge/discharge, and are thus likely to prevent breakage of the electrode structure. The average particle size of the silicon particles 12 is determined through observation of the cross section of the particles 10 of the negative electrode active material using a scanning electron microscope (SEM) or a transmission electron microscope (TEM), and specifically, is obtained by averaging the longest particle diameters of one hundred silicon particles 12.

The silicate phase 11 includes Na, Si, and $M^x$, wherein $M^x$ is an element other than an alkali metal or Si. In the silicate phase 11, regarding the content of elements other than oxygen, the Na content is 9 to 52 mol %, the $M^x$ content is 3 to 50 mol %, and the Si content is 25 mol % or more. Thus the silicate phase 11, having the specific components in the predetermined amount, as stated hereinabove, has a hardness sufficient to prevent the volume change of the silicon particles 12 and also has high ion conductivity. With respect to the silicon particles 12 dispersed in such a silicate phase 11, the volume change due to the charge/discharge reaction is reduced to thereby prevent the breakage of the particle structure through the charge/discharge cycle, and thus, the deterioration in the charge/discharge cyclic characteristics of the battery can be prevented. $M^x$ is any one of M, $M^1$, $M^2$, $M^3$, and $M^4$, and M, $M^1$, $M^2$, $M^3$, and $M^4$ are elements for MO, $M^1_2O_3$, $M^2O_2$, $M^3_2O_5$, and $M^4O$, respectively. Thus, it can be considered that the silicate phase 11 has a structure in which Na, $M^x$, O and si, which may be derived from $Na_2O$, oxides such as MO, $M^1O_2$, $M^2_2O_3$, $M^3_2O_5$, and $M^4O_3$, and $SiO_2$ are bonded to one another.

It is preferable that the silicate phase 11 include the alkali earth metal M as a result of, for example, adding MO and sintering the resultant to produce the silicate phase 11.

Specifically, it is preferable that the silicate phase 11 include any one element of Mg, Ca, Sr, Ba, Ra, Pb, and Cu as a result of adding as MO at least any one of MgO, CaO, SrO, BaO, RaO, PbO, and CuO and sintering the resultant. Particularly, it is preferable that the silicate phase 11 include Mg or Ca as a result of adding as MO at least either one of MgO or CaO and sintering the resultant. Through adding the oxide and sintering the resultant, the hardness or the ion conductivity of the silicate phase 11 may increase to thereby securely prevent the deterioration in the charge/discharge cyclic characteristics or obtain a larger battery capacity.

It is preferable that the silicate phase 11 include $M^1$ as a result of, for example, adding $M^1O_2$ and sintering the resultant to produce the silicate phase 11. Specifically, it is preferable that the silicate phase 11 include any one element of Zr, Ge, and Ti as a result of adding as $M^1O_2$ at least any one of $ZrO_2$, $GeO_2$, and $TiO_2$ and sintering the resultant. Particularly, it is preferable that silicate phase 11 include Mg or Ca as a result of adding at least either one of $TiO_2$ or $ZrO_2$ and sintering the resultant. Through adding the oxide and sintering the resultant, the hardness or the ion conductivity of the silicate phase 11 may increase to thereby securely prevent the deterioration in the charge/discharge cyclic characteristics or obtain a larger battery capacity.

It is preferable that the silicate phase 11 include $M^2$ as a result of, for example, adding $M^2_2O_3$ and sintering the resultant to produce the silicate phase 11. Specifically, it is preferable that the silicate phase 11 include any one element of Al, B, Bi, Y, and Sb as a result of adding as $M^2_2O_3$ at least any one of $Al_2O_3$, $B_2O_3$, $Bi_2O_3$, $Y_2O_3$, and $Sb_2O_3$ and sintering the resultant. Particularly, it is preferable that the silicate phase 11 include Y, B, or Al as a result of adding at least one of $Y_2O_3$, $B_2O_3$, and $Al_2O_3$ and sintering the resultant. Through adding the oxide and sintering the resultant, the hardness or the ion conductivity of the silicate phase 11 may increase to thereby securely prevent the deterioration in the charge/discharge cyclic characteristics or obtain a larger battery capacity.

It is preferable that the silicate phase 11 include $M^1$ as a result of, for example, adding $M^3_2O_5$ and sintering the resultant to produce the silicate phase 11. Specifically, it is preferable that the silicate phase 11 include any one element of Nb, La, Ta, P, and V, as a result of adding as $M^3_2O_5$ at least any one of $Nb_2O_5$, $La_2O_5$, $Ta_2O_5$, $P_2O_5$, and $V_2O_5$ and sintering the resultant. Particularly, it is preferable that the silicate phase 11 include Nb, V, La, or Ta, a result of adding at least any one of $Nb_2O_5$, $V_2O_5$, $La_2O_5$, and $Ta_2O_5$ and sintering the resultant. Through adding the oxide and sintering the resultant, the hardness or the ion conductivity of the silicate phase 11 may increase to thereby securely prevent the deterioration in the charge/discharge cyclic characteristics or obtain a larger battery capacity.

It is preferable that the silicate phase 1 include $M^1$ as a result of, for example, adding $M^4O_3$ and sintering the resultant to produce the silicate phase 11. Specifically, it is preferable that the silicate phase 11 include any one element of Nb, La, Ta, P, and V as a result of adding, as $M^4O_3$, $WO_3$ and sintering the resultant. Through adding the oxide and sintering the resultant, the hardness or the ion conductivity of the silicate phase 1 may increase to thereby securely prevent the deterioration in the charge/discharge cyclic characteristics or obtain a larger battery capacity.

With respect to the composition and content for a more preferable silicate phase 11, the silicate phase 11 includes Na, at least one element of Mg, Ca, Ti, Zr, Y, B, Al, Nb, V, La, Ta, and W, and Si, and in the silicate phase 11, the Na content is 9 to 52 mol %, the element is 3 to 50 mol %, and the Si content is 25 mol % or more, each based on the total amount other than Na, Si, and oxygen. Alternatively, the silicate phase 11 includes Na, an element A of Mg, an element B including at least any one of Ca, Ti, Zr, Y, B, Al, Nb, V, La, Ta, and W, and Si, and in the silicate phase 11, the Na content is 9 to 52 mol %, the content of the element as the element A is 3 to 12 mol %, the content of the element as the element B is 3 to 50 mol %, and the Si content is 50 mol % or more, each based on the total amount of elements other than oxygen. With the above-described composition and content, the hardness or the ion conductivity of the silicate phase 11 may be enhanced to thereby securely prevent the deterioration in the charge/discharge cyclic characteristics or obtain a larger battery capacity.

The silicate phase 11 may include Na, an element selected from at least any one of M, $M^1$, $M^2$, $M^3$, and $M^4$, wherein M is an alkali earth metal, $M^1$, $M^2$, $M^3$, and $M^4$ are each an element other than an alkali metal, an alkaline earth metal, or Si, and a compound other than Si, but it is preferable that alkali metals other than Na, such as Li and K, be not substantially included. Specifically, the content of the alkali metals other than Na in the silicate phase 11 is preferably less than 5 mol %. When 5 mol % or more of an alkali metal other than Na is included in the silicate phase 11, migration of lithium ions may be inhibited by the interaction between the alkali metal and Na to reduce the preventing effect on the deterioration in the charge/discharge cyclic characteristics.

Quantification of each metal oxide in the silicate phase 11 can be estimated using inductively coupled plasma atomic emission spectroscopy (ICP-AES) by the following method.

First, a sample of the silicate phase 11 is thoroughly dissolved in a hot acid solution (mixed acid of hydrofluoric acid, nitric acid, and sulfuric acid), and carbon that is the insoluble residue is removed by filtration. The filtrate obtained is analyzed by ICP-AES to determine the spectral intensity of each metal element. A calibration curve is prepared using commercially available standard solutions of metal elements, and the content of each metal element included in the silicate phase 11 is calculated on the calibration curve. The contents of silicon and boron are determined in the same manner as above, except that the sample is melted with sodium carbonate followed by filtration.

The amount of the metal oxide supposed can also be calculated from the content of each metal element. For example, in the case where the metal element is Al, the amount of $Al_2O_3$ calculated on the supposition that all Al forms $Al_2O_3$ is taken as the amount of the Al oxide assumed. In the case where the metal element is Ca, the amount of CaO calculated on the supposition that all Ca forms CaO is taken as the amount of the Ca oxide assumed.

The content of the sodium silicate phase 11 is preferably 5 mass % to 80 mass % and more preferably 25 mass % to 65 mass % based on the total mass of the base particle 13 in view of, for example, the improvement in the charge/discharge cyclic characteristics.

The average particle size of the particles 10 of the negative electrode active material is preferably 1 to 15 μm, and more preferably 4 to 10 μm in view of, for example, larger capacity and the improvement in the cyclic characteristics. The average particle size of the particles 10 of the negative electrode active material herein means a diameter (a volume average particle size) at an integrated volume of 50% in the particle size distribution analyzed according to the laser diffraction/scattering method (using, for example, "LA-750" manufactured by HORIBA, Ltd.). If the average particle size of the particles 10 of the negative electrode active material is too small, the surface area thereof is larger, and therefore the amount thereof reacting with an electrode is likely to be larger, resulting in decrease in the capacity. On the other hand, if the average particle size of the particles 10 of the negative electrode active material is too large, the change in the volume due to charge/discharge may be larger, sometimes resulting in reduction in the preventing effect on the decrease in the charge/discharge cyclic characteristics. Although iy is preferable to form a conductive layer 14 on the surface of the particles 10 (base particle 13) of the negative electrode active material, the thickness of the conductive layer 14 is so small that it has substantially no influence on the average particle size of the particles 10 of the negative electrode active material (the particle size of the particle 10 of the negative electrode active material≈the particle size of the base particle 13).

The particles 10 of the negative electrode active material may be used alone as a negative electrode active material to the negative electrode mixture layer, or may be combined with another active material. For example, a carbon material such as graphite is preferable as the other active material. When a carbon material is combined therewith, the mass ratio of the particles 10 of the negative electrode active material and the carbon material is preferably 1:99 to 30:70 in view of, for example, a larger capacity and the improvement in the charge/discharge cyclic characteristics.

The base particles 13 are produced through, for example, the following steps 1 to 4. The following steps are each preferably conducted in an inert atmosphere although, step 1 can be conducted in atmospheric air.

(1) Predetermined amounts of a Na material, a Si material, and a material including at least any one of an M material, an $M^1$ material, an $M^2$ material, an $M^3$ material, and an $M^4$ material are mixed, and the mixture is heated and melted. The melt is made into flakes through metal rollers to produce silicate. Then, the silicate flakes are heat-treated for crystallization in atmospheric air at a temperature of the glass transition point or more and the melting point or less. Alternately, the silicate flakes may be used without undergoing crystallization. The mixture obtained by mixing the predetermined amounts of the materials may be fired at a temperature equal to or less than the crystal melting point without undergoing melting, to thereby produce silicate through a solid-phase reaction. Examples of the Na material include sodium oxide, sodium carbonate, and sodium hydroxide. Examples of the Si material include silicon oxide. Examples of the M material include an oxide, a hydroxide, and a carbonate compound of an alkaline earth metal. Examples of the $M^1$ material, the $M^2$ material, the $M^3$ material, and the $M^4$ material include an oxide, a hydroxide, and a carbonate compound of an element other than an alkali metal, an alkaline earth metal, or Si. It is preferable to avoid contamination with an alkali metal other than sodium as much as possible, because the existence of an alkali metal other than sodium, such as lithium or potassium, in the silicate decreases the ion conductivity. However, when the silicate is contaminated with any alkali metal other than sodium as an inevitable impurity, the content thereof is preferably less than 5 mol %.

(2) A silicate powder obtained by grinding the silicate described above to the average particle size of approximately several micrometers to several tens of micrometers and Si powder having an average particle size of approximately several micrometers to several tens of micrometers are mixed in a weight ratio of, for example, 20:80 to 95:5 to produce a mixture.

(3) Then, the mixture is ground for atomization in a ball mill. Alternatively, the material powders may each be atomized and then mixed to produce a mixture. The time duration for the grinding treatment is desirably a duration such that the crystallite size of the ground powder becomes 25 nm or less, the crystallite size of the ground powder being calculated by Scherrer equation from the half width of the diffraction peak of the Si (111) plane in the XRD pattern obtained by XRD measurement on the ground powder. The specific conditions and the like for the measurement of the crystallite size are as follows.

Measurement system: In-plane multipurpose X-ray diffraction system Ultima IV (manufactured by Rigaku Corporation)

Analytical software: one-stop full-function powder X-ray diffraction analysis software PDXL (manufactured by Rigaku Corporation)

Measurement conditions: 20 to 90°, using a diffraction peak of Si(111) plane (2=28 to 29°), 5000 counts or more at the top of the peak Anticathode: Cu-Kα

Tube current/voltage: 40 mA/40 kV

Counting time: 1.0 s

Divergence slit: 2/3°

Vertical divergence limiting slit: 10 mm

Scattering slit: 2/3°

Light receiving slit: 0.3 mm

Sample spinning: 60 rpm (4) The ground mixture is heat-treated at, for example, 600 to 1000° C. In this heat treatment, pressure may be applied to the mixture, as in hot press, to produce a sintered compact of the mixture. The Si powder and the silicate powder may be mixed and heat-treated without using a ball mill to produce base particles 13.

The silicate produced in step (1) is for forming the silicate phase 11 described above and has high hardness. Thus, the silicate powder having a high hardness is brought into contact with the Si powder in step (3), and the Si powder is therefore easily atomized. Thus, the time required for reaching the prescribed atomization level can be shortened.

The conductive material for forming the conductive layer 14 is preferably electrochemically stable, and is preferably at least one selected from the group consisting of a carbon material, a metal, and a metal compound. As the carbon material, carbon black, acetylene black, Ketjen black, graphite, and a mixture of two or more thereof can be used, as in the conductive material for the positive electrode mixture layer. As the metal, copper, nickel, and an alloy thereof that is stable in the electric potential range of the negative electrode can be used. Examples of the metal compounds include a copper compound and a nickel compound (a metal or metal compound layer can be formed on the surface of the base particle 13 by, for example, nonelectrolytic plating). Among these, the carbon material is particularly preferably used.

Examples of the method for coating the surface of the base particle 13 with the carbon material include a CVD method involving using acetylene, methane, or the like, and a method in which the base particles 13 are mixed and heat-treated with coal pitch, petroleum pitch, a phenol resin, or the like. Alternatively, carbon black, Ketjen black, or the like may be adhered to the surface of the base particles 13 with a binder.

Preferably, almost the whole area of the surface of the base particle 13 is covered with the conductive layer 14. The thickness of the conductive layer 14 is preferably 1 to 200 nm and more preferably 5 to 100 nm in view of ensuring the conductivity and the diffusibility of lithium ions into the base particles 13. If the thickness of the conductive layer 14 is too small, the conductivity decreases, and it is also difficult to uniformly cover the base particles 13. On the other hand, if the thickness of the conductive layer 14 is too large, there is a tendency for the diffusion of the lithium ions into the base particles 13 to be inhibited and decrease the capacity. The thickness of the conductive layer 14 can be measured through the observation of the cross section of the particle using SEM, TEM, or the like.

[Electrolyte]

The electrolyte includes a solvent and an electrolyte salt dissolved in the solvent. The Electrolyte is not Limited to a Liquid Electrolyte and May be a Solid Electrolyte Using a gel polymer or the like. As the solvent, it is possible to use a non-aqueous solvent comprising, for example, esters, ethers, nitriles such as acetonitrile, amides such as dimethylformamide, and mixed solvents of two or more thereof or an aqueous solvent. The non-aqueous solvent may contain a halogen-substituted product formed by replacing at least one hydrogen atom of any of the above solvents with a halogen atom such as fluorine.

Examples of the esters include cyclic carbonate esters, such as ethylene carbonate (EC), propylene carbonate (PC), and butylene carbonate; chain carbonate esters, such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylate esters such as α-butyrolactone (GBL) and α-valerolactone (GVL); and chain carboxylate esters such as methyl acetate, ethyl acetate, propyl acetate, methyl propionate (MP), ethyl propionate, and α-butyrolactone.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers such as, 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the halogen-substituted product preferable for use include a fluorinated cyclic carbonate ester such as fluoroethylene carbonate (FEC), a fluorinated chain carbonate ester, and a fluorinated chain carboxylate ester such as methyl fluoropropionate (FMP).

As the electrolyte salt, a lithium salt or the like is used. Examples of the lithium salt include $LiBF_4$, $LiClO_4$, $LiPF_6$, $LiAsF_6$, $LiSbF_6$, $LiACl_4$, $LiSCN$, $LiCF_3SO_3$, $LiCF_3CO_2$, $Li(P(C_2O_4)F_4)$, $LiPF_{6-x}(C_nF_{2n+1})_x$ (1<x<6, n is 1 or 2), $LiB_{10}Cl_{10}$, LiCl, LiBr, LiI, chloroborane lithium, lithium lower aliphatic carboxylate, borates such as $Li_2B_4O_7$ and $Li(B(C_2O_4)F_2)$, and imide salts such as $LiN(SO_2CF_3)_2$, $LiN(C_lF_{2l+1}SO_2)(C_mF_{2m+1}SO_2)$ (wherein l and m are integers of 0 or more). These lithium salts may be used singly or two or more thereof may be mixed and used. Among these, $LiPF_6$ is preferably used in view of ionic conductivity, electrochemical stability, and other properties. The concentration of the lithium salt is preferably 0.8 to 1.8 mol per 1 L of the non-aqueous solvent.

[Separator]

An ion-permeable and insulating porous sheet is used as the separator. Specific examples of the porous sheet include a microporous thin film, woven fabric, and nonwoven fabric. Suitable examples of the material for the separator include olefin resins such as polyethylene and polypropylene, and cellulose. The separator may be a laminate including a cellulose fiber layer and a layer of fibers of a thermoplastic resin such as an olefin resin.

EXAMPLES

Hereinafter, the present disclosure will be described in more detail by way of Examples, but the present disclosure is not limited thereby.

Example 1

[Production of Negative Electrode Active Material]

Silicon dioxide, sodium oxide, and calcium oxide were mixed in a molar ratio of $SiO_2/Na_2O/CaO=60/35/5$. The resulting mixture was melted in an inert atmosphere at 1500° C. for 5 hours, and the melt was passed through metal rollers to obtain flakes. The flakes were heat-treated for crystallization at 750° C. for 5 hours to produce silicate including Si, Na, and Ca.

The silicate was ground to an average particle size of 10 μm to obtain a silicate powder. In an inert atmosphere, a Si powder (3N, 10 μm ground product) and the silicate powder were mixed in a mass ratio of 42:58 and placed in a pot (made of SUS, volume: 500 mL) of a planetary ball mill (P-5, manufactured by FRITSCH). Twenty four SUS balls (diameter: 20 mm) were placed in the pot, and a lid was put thereon, followed by grinding treatment at 200 rpm for 25 hours. Then, the resulting powder was taken out in an inert atmosphere, and heat-treated in conditions of a temperature of 600° C. for 4 hours in an inert atmosphere. The heat-treated powder (hereinafter, referred to as base particles) was ground and passed through a 40-μm mesh, and the resulting powder was mixed with coal pitch (MCP 250, manufactured by JFE Chemical Corporation). The mixture was heat-treated in conditions of a temperature of 800° C. for 5 hours in an inert atmosphere to coat the surface of each base particle with carbon, thereby forming a conductive layer. The amount of the carbon coating was 5 mass % based on the total mass of the particle composed of the base particle and the conductive layer. The resultant was then conditioned using an Elbow-Jet classifier so as to have an average particle size of 5 μm, thereby obtaining a negative electrode active material.

[Analysis of Negative Electrode Active Material]

As a result of observation with SEM on the cross sections of the particles of the negative electrode active material, the Si particles were found to have an average particle size of less than 100 nm. The content of each metal was measured through ICP emission spectral analysis, and the content of each oxide was calculated. Si is composed of the oxide of the silicate phase and a Si powder mixed in the grinding step, and it is necessary to distinguish the oxide from the Si powder. The amount of Si included in the whole of the negative electrode active material was determined through ICP emission spectral analysis. Si particles in the silicate phase were heated for crystallization in a vacuumed atmosphere at 950° C. for 10 hours, and the resulting powder was subjected to XRD analysis. The Si content was calculated from the integrated value of Si peaks in the XRD analysis. The amount of the Si oxide in the silicate phase was determined by arithmetic operation. As a result, the contents of Si, Na, and Ca elements in the silicate phase were 44.4 mol %, 51.9 mol %, and 3.7 mol %, respectively.

[Preparation of Negative Electrode]

Next, the above-described negative electrode active material and polyacrylonitrile (PAN) were mixed in a mass ratio of 95:5, and N-methyl-2-pyrrolidone (NMP) was added thereto. The resulting mixture was then stirred using a mixer (THINKY MIXER Awatori-Rentaroh, manufactured by THINKY CORPORATION) to prepare a negative electrode mixture slurry. Then, the slurry was applied to one side of a copper foil so that the mass of the negative electrode mixture layer was 25 g per m². The coating was dried at 105° C. in atmospheric air, and then rolled to produce a negative electrode. The packing density of the negative electrode mixture layer was 1.50 g/cm³.

[Preparation of Non-Aqueous Electrolyte Solution]

Ethylene carbonate (EC) and diethyl carbonate (DEC) were mixed in a volume ratio of 3:7. $LiPF_6$ was added to the mixed solvent to a concentration of 1.0 mol/L to thereby prepare a non-aqueous electrolyte solution.

[Production of Non-Aqueous Electrolyte Secondary Battery]

In an inert atmosphere, the negative electrode described above and a lithium metal foil each having a Ni tab attached thereto were disposed opposite to each other with a polyethylene separator interposed therebetween to thereby form an electrode assembly. The electrode assembly was then housed in a battery exterior body made of an aluminum-laminated film, and the non-aqueous electrolyte solution was injected to the battery exterior body. The battery exterior body was sealed to thereby prepare a non-aqueous electrolyte secondary battery.

Example 2

A silicate including Si, Na, and Ca was produced under the same conditions as in Example 1, except that silicon dioxide, sodium oxide, and calcium oxide were mixed in a molar ratio of $SiO_2/Na_2O/CaO=55/35/10$. Then, a negative electrode active material and a non-aqueous electrolyte secondary battery were produced under the same conditions as in Example 1, except that the above-described silicate was used. As a result of observation with SEM on the cross sections of the particles of the negative electrode active material, the Si particles were found to have an average particle size of less than 100 nm. As a result of measurement of the contents of the elements in the silicate phase in the same manner as in Examples 1, the Si content was 40.7 mol %, the Na content of 51.9 mol %, and the Ca content was 7.4 mol %.

Example 3

A silicate including Si, Na, and Ca was produced under the same conditions as in Example 1, except that silicon dioxide, sodium oxide, and calcium oxide were mixed in a molar ratio of $SiO_2/Na_2O/CaO=50/35/15$. Then, a negative electrode active material and a non-aqueous electrolyte secondary battery were produced under the same conditions as in Example 1, except that the above-described silicate was used. As a result of observation with SEM on the cross sections of the particles of the negative electrode active material, the Si particles were found to have an average particle size of less than 100 nm. As a result of measurement of the contents of the elements in the silicate phase in the same manner as in Examples 1, the Si content was 37 mol %, the Na content was 51.9 mol %, and the Ca content was 11.1 mol %.

Example 4

A silicate including Si, Na, B, and Al was produced under the same conditions as in Example 1, except that silicon dioxide, sodium oxide, boron oxide, and aluminum oxide were mixed in a molar ratio of $SiO_2/Na_2O/B_2O_3/Al_2O_3=59/15/6/20$. Then, a negative electrode active material and a non-aqueous electrolyte secondary battery were produced under the same conditions as in Example 1, except that the above-described silicate was used. As a result of observation with SEM on the cross sections of the particles of the negative electrode active material, the Si particles were found to have an average particle size of less than 100 nm. As a result of measurement of the contents of the elements in the silicate phase in the same manner as in Examples 1, the Si content was 41.8 mol %, the Na content was 21.3 mol %, the B content was 8.5 mol %, and the Al content was 28.4 mol %.

Example 5

A silicate including Si, Na, B, and Al was produced under the same conditions as in Example 1, except that silicon dioxide, sodium oxide, boron oxide, and aluminum oxide were mixed in a molar ratio of $SiO_2/Na_2O \% B_2O_3/Al_2O_3=54/10/6/30$. Then, a negative electrode active material and a non-aqueous electrolyte secondary battery were produced under the same conditions as in Example 1, except that the above-described silicate was used. As a result of observation with SEM on the cross sections of the particles of the negative electrode active material, the Si particles were found to have an average particle size of less than 100 nm. As a result of measurement of the contents of the elements in the silicate phase in the same manner as in Examples 1 through ICP emission spectral analysis, the Si content was 37 mol %, the Na content was 13.7 mol %, the B content was 8.2 mol %, and the Al content was 41.1 mol %.

Example 6

A silicate including Si, Na, and Mg was produced under the same conditions as in Example 1, except that silicon dioxide, sodium oxide, and magnesium oxide were mixed in a molar ratio of $SiO_2/Na_2O/MgO=55/35/10$. Then, a negative electrode active material and a non-aqueous electrolyte secondary battery were produced under the same conditions as in Example 1, except that the above-described silicate was used. As a result of observation with SEM on the cross sections of the particles of the negative electrode active material, the Si particles were found to have an average particle size of less than 100 nm. As a result of measurement of the contents of the elements in the silicate phase in the same manner as in Examples 1, the Si content was 40.7 mol %, the Na content of 51.9 mol %, and the Mg content was 7.4 mol %. The $SiO_2$ content was 55 mol %, the $Na_2O$ content was 35 mol %, and the MgO content was 10 mol %.

Example 7

A silicate including Si, Na, and Mg was produced under the same conditions as in Example 1, except that silicon dioxide, sodium oxide, and magnesium oxide were mixed in a molar ratio of $SiO_2/Na_2O/MgO=50/35/15$. Then, a negative electrode active material and a non-aqueous electrolyte secondary battery were produced under the same conditions as in Example 1, except that the above-described silicate was used. As a result of observation with SEM on the cross sections of the particles of the negative electrode active material, the Si particles were found to have an average particle size of less than 100 nm. As a result of measurement of the contents of the elements in the silicate phase in the same manner as in Examples 1, the Si content was 37 mol %, the Na content was 51.9 mol %, and the Mg content was 11.1 mol %.

Example 8

A silicate including Si, Na, Ca, and Y was produced under the same conditions as in Example 1, except that silicon dioxide, sodium oxide, calcium oxide, and yttrium oxide were mixed in a molar ratio of $SiO_2/Na_2O/CaO/Y_2O_3=59/30/1/10$. Then, a negative electrode active material and a non-aqueous electrolyte secondary battery were produced under the same conditions as in Example 1, except that the above-described silicate was used. As a result of observation with SEM on the cross sections of the particles of the negative electrode active material, the Si particles were found to have an average particle size of less than 100 nm. As a result of measurement of the contents of the elements in the silicate phase in the same manner as in Examples 1, the Si content was 42.1 mol %, the Na content was 42.9 mol %, the Ca content was 0.7 mol %, and the Y content was 14.3 mol %.

Example 9

A silicate including Si, Na, and T was produced under the same conditions as in Example 1, except that silicon dioxide, sodium oxide, and titanium oxide were mixed in a molar ratio of $SiO_2/Na_2O/TiO_2=60/30/10$. Then, a negative electrode active material and a non-aqueous electrolyte secondary battery were produced under the same conditions as in Example 1, except that the above-described silicate was used. As a result of observation with SEM on the cross sections of the particles of the negative electrode active material, the Si particles were found to have an average particle size of less than 100 nm. As a result of measurement of the contents of the elements in the silicate phase in the same manner as in Examples 1, the Si content was 46.2 mol %, the Na content was 46.2 mol %, and the Ti content was 7.7 mol %.

Example 10

A silicate including Si, Na, and Zr was produced under the same conditions as in Example 1, except that silicon dioxide, sodium oxide, and zirconium oxide were mixed in a molar ratio of $SiO_2/Na_2O/ZrO_2=60/30/10$. Then, a negative electrode active material and a non-aqueous electrolyte secondary battery were produced under the same conditions as in Example 1, except that the above-described silicate was used. As a result of observation with SEM on the cross sections of the particles of the negative electrode active material, the Si particles were found to have an average particle size of less than 100 nm. As a result of measurement of the contents of the elements in the silicate phase in the same manner as in Examples 1, the Si content was 46.2 mol %, the Na content was 46.2 mol %, and the Zr was 7.7 mol %.

Example 11

A silicate including Si, Na, Zr, and Ti was produced under the same conditions as in Example 1, except that silicon dioxide, sodium oxide, titanium oxide, and zirconium oxide were mixed in a molar ratio of $SiO_2/Na_2O/TiO_2/ZrO_2=60/30/5/5$. Then, a negative electrode active material and a non-aqueous electrolyte secondary battery were produced under the same conditions as in Example 1, except that the above-described silicate was used. As a result of observation with SEM on the cross sections of the particles of the negative electrode active material, the Si particles were found to have an average particle size of less than 100 nm. As a result of measurement of the contents of the elements in the silicate phase in the same manner as in Examples 1, the Si content was 46.2 mol %, the Na content was 46.2 mol %, the Ti content was 3.8 mol %, and the Zr content was 3.8 mol %.

Example 12

A silicate including Si, Na, and Nb was produced under the same conditions as in Example 1, except that silicon dioxide, sodium oxide, and niobium oxide were mixed in a molar ratio of $SiO_2/Na_2O/Nb_2O_5=60/30/10$. Then, a negative electrode active material and a non-aqueous electrolyte secondary battery were produced under the same conditions as in Example 1, except that the above-described silicate was used. As a result of observation with SEM on the cross sections of the particles of the negative electrode active material, the Si particles were found to have an average particle size of less than 100 nm. As a result of measurement of the contents of the elements in the silicate phase in the same manner as in Examples 1, the Si content was 42.9 mol %, the Na content was 42.9 mol %, and the Nb content was 14.3 mol %.

Example 13

A silicate including Si, Na, and V was produced under the same conditions as in Example 1, except that silicon dioxide, sodium oxide, and vanadium oxide were mixed in a molar ratio of $SiO_2/Na_2O/V_2O_5=60/30/10$. Then, a negative electrode active material and a non-aqueous electrolyte secondary battery were produced under the same conditions as in Example 1, except that the above-described silicate was used. As a result of observation with SEM on the cross sections of the particles of the negative electrode active material, the Si particles were found to have an average particle size of less than 100 nm. As a result of measurement of the contents of the elements in the silicate phase in the same manner as in Examples 1, the Si content was 42.9 mol %, the Na content was 42.9 mol %, and the V content was 14.3 mol %.

Example 14

A silicate including Si, Na, and La was produced under the same conditions as in Example 1, except that silicon dioxide, sodium oxide, and lanthanum oxide were mixed in a molar ratio of $SiO_2/Na_2O/La_2O_5=60/30/10$. Then, a negative electrode active material and a non-aqueous electrolyte secondary battery were produced under the same conditions as in Example 1, except that the above-described silicate was used. As a result of observation with SEM on the cross sections of the particles of the negative electrode active material, the Si particles were found to have an average particle size of less than 100 nm. As a result of measurement of the contents of the elements in the silicate phase in the same manner as in Examples 1, the Si content was 42.9 mol %, the Na content was 42.9 mol %, and the La content was 14.3 mol %.

Example 15

A silicate including Si, Na, and Ta was produced under the same conditions as in Example 1, except that silicon dioxide, sodium oxide, and tantalum oxide were mixed in a molar ratio of $SiO_2/Na_2O/Ta_2O_5=60/30/10$. Then, a negative electrode active material and a non-aqueous electrolyte secondary battery were produced under the same conditions as in Example 1, except that the above-described silicate was used. As a result of observation with SEM on the cross sections of the particles of the negative electrode active material, the Si particles were found to have an average particle size of less than 100 nm. As a result of measurement of the contents of the elements in the silicate phase in the same manner as in Examples 1, the Si content was 42.9 mol %, the Na content was 42.9 mol %, and the Ta content was 14.3 mol %.

Example 16

A silicate including Si, Na, and W was produced under the same conditions as in Example 1, except that silicon dioxide, sodium oxide, and tungsten oxide were mixed in a molar ratio of $SiO_2/Na_2O/WO_3=60/30/10$. Then, a negative electrode active material and a non-aqueous electrolyte secondary battery were produced under the same conditions as in Example 1, except that the above-described silicate was used. As a result of observation with SEM on the cross sections of the particles of the negative electrode active material, the Si particles were found to have an average particle size of less than 100 nm. As a result of measurement of the contents of the elements in the silicate phase in the same manner as in Examples 1, the Si content was 46.2 mol %, the Na content was 46.2 mol %, and the W content was 7.7 mol %.

Example 17

A silicate including $SiO_2$, Na, Y, Al, Ti, Zr, and Nb was produced under the same conditions as in Example 1, except that silicon dioxide, sodium oxide, yttrium oxide, aluminum oxide, titanium oxide, zirconium oxide, and niobium oxide were mixed in a molar ratio of $SiO_2/Na_2O/Y_2O_3/Al_2O_3/TiO_2/ZrO_2/Nb_2O_5=60/30/2/2/2/2/2$. Then, a negative electrode active material and a non-aqueous electrolyte secondary battery were produced under the same conditions as in Example 1, except that the above-described silicate was used. As a result of observation with SEM on the cross sections of the particles of the negative electrode active material, the Si particles were found to have an average particle size of less than 100 nm. As a result of measurement of the contents of the elements in the silicate phase in the same manner as in Examples 1, the Si content was 44.1 mol %, the Na content was 44.1 mol %, the Y content was 2.9 mol %, the Al content was 2.9 mol %, the Ti content was 1.5 mol %, the Zr content was 1.5 mol %, and the Nb content was 2.9 mol %.

Example 18

A silicate including Si, Na, Y, Ti, Zr, V, and La was produced under the same conditions as in Example 1, except that silicon dioxide, sodium oxide, yttrium oxide, titanium oxide, zirconium oxide, vanadium oxide, and lanthanum oxide were mixed in a molar ratio of $SiO_2/Na_2O/Y_2O_3/TiO_2/ZrO_2/V_2O_5/La_2O_5=60/30/2/2/2/2/2$. Then, a negative electrode active material and a non-aqueous electrolyte secondary battery were produced under the same conditions as in Example 1, except that the above-described silicate was used. As a result of observation with SEM on the cross sections of the particles of the negative electrode active material, the Si particles were found to have an average particle size of less than 100 nm. As a result of measurement of the contents of the elements in the silicate phase in the same manner as in Examples 1, the Si content was 44.1 mol %, the Na content was 44.1 mol %, the Y content was 2.9 mol %, the Ti content was 1.5 mol %, the Zr content was 1.5 mol %, the V content was 2.9 mol %, and the La content was 2.9 mol %.

Example 19

A silicate including Si, Na, and Zr was produced under the same conditions as in Example 1, except that silicon dioxide, sodium oxide, and zirconium oxide were mixed in a molar ratio of $SiO_2/Na_2O/ZrO_2=90/5/5$. Then, a negative electrode active material and a non-aqueous electrolyte secondary battery were produced under the same conditions as in Example 1, except that the above-described silicate was used. As a result of observation with SEM on the cross sections of the particles of the negative electrode active material, the Si particles were found to have an average particle size of less than 100 nm. As a result of measurement of the contents of the elements in the silicate phase in the same manner as in Examples 1, the Si content was 85.7 mol %, the Na content was 9.5 mol %, and the Zr content was 4.8 mol %.

Example 20

A silicate including Si, Na, Mg, and Zr was produced under the same conditions as in Example 1, except that silicon dioxide, sodium oxide, magnesium oxide, and zirconium oxide were mixed in a molar ratio of $SiO_2/Na_2O/MgO/ZrO_2=60/30/5/5$. Then, a negative electrode active material and a non-aqueous electrolyte secondary battery were produced under the same conditions as in Example 1, except that the above-described silicate was used. As a result of observation with SEM on the cross sections of the particles of the negative electrode active material, the Si particles were found to have an average particle size of less than 100 nm. As a result of measurement of the contents of the elements in the silicate phase in the same manner as in Examples 1, the Si content was 46.2 mol %, the Na content was 46.2 mol %, the Mg content was 3.8 mol %, and the Zr content was 3.8 mol %.

Comparative Example 1

A silicate including Si, Na, and Zr was produced under the same conditions as in Example 1, except that silicon dioxide, sodium oxide, and zirconium oxide were mixed in a molar ratio of $SiO_2/Na_2O/ZrO_2=94/1/5$. Then, a negative electrode active material and a non-aqueous electrolyte secondary battery were produced under the same conditions as in Example 1, except that the above-described silicate was used. As a result of observation with SEM on the cross sections of the particles of the negative electrode active material, the Si particles were found to have an average particle size of less than 100 nm. As a result of measurement of the contents of the elements in the silicate phase in the same manner as in Examples 1, the Si content was 93.1 mol %, the Na content was 2 mol %, and the Zr content was 5 mol %.

Comparative Example 2

A silicate including Si, Na, and Zr was produced under the same conditions as in Example 1, except that silicon dioxide, sodium oxide, and zirconium oxide were mixed in a molar ratio of $SiO_2/Na_2O/ZrO_2=94/5/1$. Then, a negative electrode active material and a non-aqueous electrolyte secondary battery were produced under the same conditions as in Example 1, except that the above-described silicate was used. As a result of observation with SEM on the cross sections of the particles of the negative electrode active material, the Si particles were found to have an average particle size of less than 100 nm. As a result of measurement of the contents of the elements in the silicate phase in the same manner as in Examples 1, the Si content was 89.5 mol %, the Na content was 9.5 mol %, and the Zr content was 1 mol %.

Comparative Example 3

A silicate including Si, Na, Mg, Ca, Zr, and La was produced under the same conditions as in Example 1, except that silicon dioxide, sodium oxide, magnesium oxide, calcium oxide, zirconium oxide, and lanthanum oxide were mixed in a molar ratio of $SiO_2/Na_2O/MgO/CaO/ZrO_2/La_2O_5=45/5/15/5/15/15$. Then, a negative electrode active material and a non-aqueous electrolyte secondary battery were produced under the same conditions as in Example 1, except that the above-described silicate was used. As a result of observation with SEM on the cross sections of the particles of the negative electrode active material, the Si particles were found to have an average particle size of less than 100 nm. As a result of measurement of the contents of the elements in the silicate phase in the same manner as in Examples 1, the Si content was 37.5 mol %, the Na content was 8.3 mol %, the Mg content was 12.5 mol %, the Ca content was 4.2 mol %, the Zr content was 12.5 mol %, and the La content was 25 mol %.

Comparative Example 4

A silicate including Si, Na, Ca, and Zr was produced under the same conditions as in Example 1, except that silicon dioxide, sodium oxide, calcium oxide, and zirconium oxide were mixed in a molar ratio of $SiO_2/Na_2O/CaO/ZrO_2=30/45/20/5$. Then, a negative electrode active material and a non-aqueous electrolyte secondary battery were produced under the same conditions as in Example 1, except that the above-described silicate was used. As a result of observation with SEM on the cross sections of the particles of the negative electrode active material, the Si particles were found to have an average particle size of less than 100 nm. As a result of measurement of the contents of the elements in the silicate phase in the same manner as in Examples 1, the Si content was 20.7 mol %, the Na content was 62.1 mol %, the Ca content was 13.8 mol %, and the Zr content was 3.4 mol %.

[Charge/Discharge Cyclic Test]

A charge/discharge cyclic test was carried out on each of the batteries according to Examples and Comparative Examples, in the following manner.

Charge

A constant current charging was carried out at a current of 1 It (800 mA) to a voltage of 4.2 V, and then a constant voltage charging was carried out at a constant voltage of 4.2 V to a current of 1/20 It (40 mA).

Discharge

A constant current discharging was carried out at a current of 1 It (800 mA) to a voltage of 2.75 V.

Quiescent Period

The quiescent period between the charge and discharge described above was 10 minutes.

Charge/Discharge Cycles

The cycle consisting of the charge and the discharge described above was carried out 100 times.

The characteristics of the silicate phase and the result of the capacity retention calculated by the equation below are shown in Tables 1 and 2. A higher capacity retention indicates that the deterioration in the charge/discharge cyclic characteristics was more highly prevented.

capacity retention (%)=(discharge capacity at 100th cycle/discharge capacity at first cycle)×100

TABLE 1

| | CONTENT OF EACH COMPONENT IN SILICATE PHASE mol % | | | | | | | | | | | | | |
|---|---|---|---|---|---|---|---|---|---|---|---|---|---|---|
| | $SiO_2$ | $Na_2O$ | MgO | CaO | $Y_2O_3$ | $B_2O_3$ | $Al_2O_3$ | $TiO_2$ | $ZrO_2$ | $Nb_2O_5$ | $V_2O_5$ | $La_3O_5$ | $Ta_2O_6$ | $WO_3$ |
| EXAMPLE 1 | 60 | 35 | | 5 | | | | | | | | | | |
| EXAMPLE 2 | 55 | 35 | | 10 | | | | | | | | | | |
| EXAMPLE 3 | 50 | 35 | | 15 | | | | | | | | | | |
| EXAMPLE 4 | 59 | 15 | | | | 6 | 20 | | | | | | | |
| EXAMPLE 5 | 54 | 10 | | | | 6 | 30 | | | | | | | |
| EXAMPLE 6 | 55 | 35 | 10 | | | | | | | | | | | |
| EXAMPLE 7 | 50 | 35 | 15 | | | | | | | | | | | |
| EXAMPLE 8 | 59 | 30 | | 1 | 10 | | | | | | | | | |
| EXAMPLE 9 | 60 | 30 | | | | | 10 | | | | | | | |
| EXAMPLE 10 | 60 | 30 | | | | | | 10 | | | | | | |
| EXAMPLE 11 | 60 | 30 | | | | | 5 | 5 | | | | | | |
| EXAMPLE 12 | 60 | 30 | | | | | | | 10 | | | | | |
| EXAMPLE 13 | 60 | 30 | | | | | | | | 10 | | | | |
| EXAMPLE 14 | 60 | 30 | | | | | | | | | 10 | | | |
| EXAMPLE 15 | 60 | 30 | | | | | | | | | | 10 | | |
| EXAMPLE 16 | 60 | 30 | | | | | | | | | | | | 10 |
| EXAMPLE 17 | 60 | 30 | | | 2 | | 2 | 2 | 2 | 2 | | | | |
| EXAMPLE 18 | 60 | 30 | | | 2 | | | 2 | 2 | | 2 | 2 | | |
| EXAMPLE 19 | 90 | 5 | | | | | | | 5 | | | | | |
| EXAMPLE 20 | 60 | 30 | 5 | | | | | | 5 | | | | | |

TABLE 1-continued

| | CONTENT OF EACH COMPONENT IN SILICATE PHASE mol % | | | | | | | | | | | | | |
|---|---|---|---|---|---|---|---|---|---|---|---|---|---|---|
| | $SiO_2$ | $Na_2O$ | MgO | CaO | $Y_2O_3$ | $B_2O_3$ | $Al_2O_3$ | $TiO_2$ | $ZrO_2$ | $Nb_2O_5$ | $V_2O_5$ | $La_3O_5$ | $Ta_2O_6$ | $WO_3$ |
| COMPARATIVE EXAMPLE 1 | 94 | 1 | | | | | | | 5 | | | | | |
| COMPARATIVE EXAMPOLE 2 | 94 | 5 | | | | | | | 1 | | | | | |
| COMPARATIVE EXAMPLE 3 | 45 | 5 | 15 | 5 | | | | | 15 | | | 15 | | |
| COMPARATIVE EXAMPLE 4 | 30 | 45 | | 20 | | | | | 5 | | | | | |

TABLE 2

| | CONTENT OF EACH ELEMENT IN SILICATE PHASE mol % | | | | | | | | | | | | | | CAPACITY RETENTION |
|---|---|---|---|---|---|---|---|---|---|---|---|---|---|---|---|
| | Si | Na | Mg | Ca | Y | B | Al | Ti | Zr | Nb | V | La | Ta | W | % |
| EXAMPLE 1 | 44.4 | 51.9 | 0.0 | 3.7 | 0.0 | 0.0 | 0.0 | 0.0 | 0.0 | 0.0 | 0.0 | 0.0 | 0.0 | 0.0 | 95 |
| EXAMPLE 2 | 40.7 | 51.9 | 0.0 | 7.4 | 0.0 | 0.0 | 0.0 | 0.0 | 0.0 | 0.0 | 0.0 | 0.0 | 0.0 | 0.0 | 93 |
| EXAMPLE 3 | 37 | 51.9 | 0.0 | 11.1 | 0.0 | 0.0 | 0.0 | 0.0 | 0.0 | 0.0 | 0.0 | 0.0 | 0.0 | 0.0 | 75 |
| EXAMPLE 4 | 41.8 | 21.3 | 0.0 | 0.0 | 8.5 | 28.4 | 0.0 | 0.0 | 0.0 | 0.0 | 0.0 | 0.0 | 0.0 | 0.0 | 95 |
| EXAMPLE 5 | 37 | 13.7 | 0.0 | 0.0 | 0.0 | 8.2 | 41.1 | 0.0 | 0.0 | 0.0 | 0.0 | 0.0 | 0.0 | 0.0 | 90 |
| EXAMPLE 6 | 40.7 | 51.9 | 7.4 | 0.0 | 0.0 | 0.0 | 0.0 | 0.0 | 0.0 | 0.0 | 0.0 | 0.0 | 0.0 | 0.0 | 95 |
| EXAMPLE 7 | 37 | 51.9 | 11.1 | 0.0 | 0.0 | 0.0 | 0.0 | 0.0 | 0.0 | 0.0 | 0.0 | 0.0 | 0.0 | 0.0 | 74 |
| EXAMPLE 8 | 42.1 | 42.9 | 0.0 | 0.7 | 14.3 | 0.0 | 0.0 | 0.0 | 0.0 | 0.0 | 0.0 | 0.0 | 0.0 | 0.0 | 95 |
| EXAMPLE 9 | 46.2 | 46.2 | 0.0 | 0.0 | 0.0 | 0.0 | 0.0 | 7.7 | 0.0 | 0.0 | 0.0 | 0.0 | 0.0 | 0.0 | 90 |
| EXAMPLE 10 | 46.2 | 46.2 | 0.0 | 0.0 | 0.0 | 0.0 | 0.0 | 0.0 | 7.7 | 0.0 | 0.0 | 0.0 | 0.0 | 0.0 | 100 |
| EXAMPLE 11 | 46.2 | 46.2 | 0.0 | 0.0 | 0.0 | 0.0 | 0.0 | 3.8 | 3.8 | 0.0 | 0.0 | 0.0 | 0.0 | 0.0 | 91 |
| EXAMPLE 12 | 42.9 | 42.9 | 0.0 | 0.0 | 0.0 | 0.0 | 0.0 | 0.0 | 0.0 | 14.3 | 0.0 | 0.0 | 0.0 | 0.0 | 100 |
| EXAMPLE 13 | 42.9 | 42.9 | 0.0 | 0.0 | 0.0 | 0.0 | 0.0 | 0.0 | 0.0 | 0.0 | 14.3 | 0.0 | 0.0 | 0.0 | 97 |
| EXAMPLE 14 | 42.9 | 42.9 | 0.0 | 0.0 | 0.0 | 0.0 | 0.0 | 0.0 | 0.0 | 0.0 | 0.0 | 14.3 | 0.0 | 0.0 | 100 |
| EXAMPLE 15 | 42.9 | 42.9 | 0.0 | 0.0 | 0.0 | 0.0 | 0.0 | 0.0 | 0.0 | 0.0 | 0.0 | 0.0 | 14.3 | 0.0 | 95 |
| EXAMPLE 16 | 46.2 | 46.2 | 0.0 | 0.0 | 0.0 | 0.0 | 0.0 | 0.0 | 0.0 | 0.0 | 0.0 | 0.0 | 0.0 | 7.7 | 85 |
| EXAMPLE 17 | 44.1 | 44.1 | 0.0 | 0.0 | 2.9 | 0.0 | 2.9 | 1.5 | 1.5 | 2.9 | 0.0 | 0.0 | 0.0 | 0.0 | 99 |
| EXAMPLE 18 | 44.1 | 44.1 | 0.0 | 0.0 | 2.9 | 0.0 | 0.0 | 1.5 | 1.5 | 0.0 | 2.9 | 2.9 | 0.0 | 0.0 | 99 |
| EXAMPLE 19 | 85.7 | 9.5 | 0.0 | 0.0 | 0.0 | 0.0 | 0.0 | 0.0 | 4.8 | 0.0 | 0.0 | 0.0 | 0.0 | 0.0 | 90 |
| EXAMPLE 20 | 46.2 | 46.2 | 3.8 | 0.0 | 0.0 | 0.0 | 0.0 | 0.0 | 3.8 | 0.0 | 0.0 | 0.0 | 0.0 | 0.0 | 85 |
| COMPARATIVE EXAMPLE 1 | 93.1 | 2.0 | 0.0 | 0.0 | 0.0 | 0.0 | 0.0 | 0.0 | 5.0 | 0.0 | 0.0 | 0.0 | 0.0 | 0.0 | 50 |
| COMPARATIVE EXAMPLE 2 | 89.5 | 9.5 | 0.0 | 0.0 | 0.0 | 0.0 | 0.0 | 0.0 | 1.0 | 0.0 | 0.0 | 0.0 | 0.0 | 0.0 | 48 |
| COMPARATIVE EXAMPLE 3 | 37.5 | 8.3 | 12.5 | 4.2 | 0.0 | 0.0 | 0.0 | 0.0 | 12.5 | 0.0 | 0.0 | 25.0 | 0.0 | 0.0 | 30 |
| COMPARATIVE EXAMPLE 4 | 20.7 | 62.1 | 0.0 | 13.8 | 0.0 | 0.0 | 0.0 | 0.0 | 3.4 | 0.0 | 0.0 | 0.0 | 0.0 | 0.0 | 5 |

As shown in Table 2, in the batteries according to Examples 1 to 20, negative electrode active materials are used, each comprising a silicate phase including Na, an element selected from at least any one of M, $M^1$, $M^2$, $M^3$, and $M^4$, wherein M is an alkali earth metal, $M^1$, $M^2$, $M^3$, and $M^4$ are each an element other than an alkali metal, an alkaline earth metal, or Si; and silicon particles dispersed in the silicate phase, wherein, in the silicate phase, the Na content is 9 to 52 mol %, the content of M, $M^1$, $M^2$, $M^3$, and $M^4$ is 3 to 50 mol %, and the Si content is 25 mol % or more, each based on the total amount of Na, Si, M, $M^1$, $M^2$, $M^3$, and $M^4$. In contrast, in the batteries of Comparative Examples 1 to 4, negative electrode active materials are used in which the contents of elements in the silicate phase do not satisfy the above-described ranges. In comparison of Examples 1 to 20 with Comparative Examples 1 to 4, all of Examples 1 to 20 resulted a higher capacity retention and further prevention of the deterioration in the charge/discharge cyclic characteristics than those of Comparative Examples 1 to 4.

REFERENCE SIGNS LIST 10 particle of negative electrode active material
11 lithium silicate phase
12 silicon particles
13 base particle
14 conductive layer

The invention claimed is:
1. A negative electrode active material for a secondary battery comprising:
  a silicate phase including elements Na, Si, and $M^x$, wherein $M^x$ represents one or more elements other than an alkali metal or Si; and
  silicon particles dispersed in the silicate phase, wherein, the $M^x$ includes at least one of elements Y, Nb, V, La, and T
  in the silicate phase, the element Na content is 9 mol % to 52 mol %, and the element $M^x$ content is 3 mol % to 50 mol %, and a Si content is 25 mol % or more, each based on the total amount other than oxygen, and the silicon particles have an average particle size of less than 100 nm.

2. The negative electrode active material for a secondary battery according to claim 1, wherein
the $M^x$ further includes at least one of elements Mg, Ca, Ti, Zr, B, Al, and W, and
in the silicate phase, the element Na content is 9 mol % to 52 mol %, the element $M^x$ content is 3 mol % to 50 mol %, and the element Si content is 25 mol % or more, each based on the total amount other than oxygen.

3. The negative electrode active material for a secondary battery according to claim 1, wherein
the element $M^x$ includes element Mg in addition to said at least one of elements Y, Nb, V, La, and Ta, and
in the silicate phase, the element Na content is 9 mol % to 52 mol %, an element Mg content is 3 mol % to 12 mol %, a content of said at least one of elements Y, Nb, V, La, and Ta, is 3 mol % to 50 mol %, and the element Si content is 25 mol % or more, each based on the total amount other than oxygen.

4. The negative electrode active material for a secondary battery according to claim 1, wherein the silicate phase includes less than 5 mol % of the alkali metal other than element Na.

5. A secondary battery comprising:
a negative electrode including the negative electrode active material for a secondary battery according to claim 1;
a positive electrode; and an electrolyte.

6. The negative electrode active material for a secondary battery according to claim 1, wherein
the negative electrode active material comprises a base particle comprising the silicate phase and the silicon particles, and
a content of the silicon particles in the base particle is 20 mass % to 95 mass % based on a total mass of the base particle.

7. The negative electrode active material for a secondary battery according to claim 1, wherein
the negative electrode active material comprises a base particle comprising the silicate phase and the silicon particles, and
a content of the silicon particles in the base particle is 35 mass % to 75 mass % based on a total mass of the base particle.

8. The negative electrode active material for a secondary battery according to claim 1, wherein
the negative electrode active material comprises a base particle comprising the silicate phase and the silicon particles, and
a content of the silicate phase is 5 mass % to 80 mass % based on a total mass of the base particle.

9. The negative electrode active material for a secondary battery according to claim 1, wherein
the negative electrode active material comprises a base particle comprising the silicate phase and the silicon particles, and
a content of the silicate phase is 25 mass % to 65 mass % based on a total mass of the base particle.

* * * * *